United States Patent

Tolliver

Patent Number: 5,901,493
Date of Patent: May 11, 1999

[54] LOW PROFILE STAGGERED TREBLE FISH HOOK

[76] Inventor: Peter Marvin Tolliver, 42 Varinna Dr., Rochester, N.Y. 14618

[21] Appl. No.: 08/724,778

[22] Filed: Oct. 3, 1996

[51] Int. Cl.⁶ .................................................. A01K 83/00
[52] U.S. Cl. ........................................ 43/43.16; 43/44.82
[58] Field of Search ................................ 43/44.82, 44.2, 43/44.8, 43.16

[56] References Cited

U.S. PATENT DOCUMENTS

| | | | |
|---|---|---|---|
| 70,913 | 11/1867 | Sterling | 43/44.8 |
| 254,313 | 2/1882 | Hemming | 43/44.8 |
| 356,661 | 1/1887 | Pfaff | 43/42.19 |
| 440,721 | 11/1890 | Provoost | 43/44.8 |
| 627,179 | 6/1899 | Dreese | 43/43.16 |
| 699,711 | 5/1902 | Pyott, Jr. | 43/42.28 |
| 1,249,342 | 12/1917 | Dahl | 43/44.8 |
| 1,261,601 | 4/1918 | Ore | 43/44.8 |
| 1,620,589 | 3/1927 | Ackerman | 43/44.8 |
| 2,047,676 | 7/1936 | Edmondson | 43/44.2 |
| 2,164,807 | 7/1939 | Evans | 43/43.16 |
| 2,266,725 | 12/1941 | Andrews | 43/43.16 |
| 2,534,469 | 12/1950 | Moore | 43/44.8 |
| 2,559,409 | 7/1951 | Dohmeyer | 43/44.8 |
| 2,563,554 | 8/1951 | Roy | 43/44.82 |
| 2,592,727 | 4/1952 | Pamer | 43/43.16 |
| 2,608,791 | 9/1952 | Wentz | 43/44.2 |
| 2,632,278 | 3/1953 | Raymond | 43/44.82 |
| 2,679,708 | 6/1954 | Matthes | 43/44.8 |
| 2,680,321 | 6/1954 | Premo | 43/44.82 |
| 2,703,947 | 3/1955 | Petrasek et al. | 43/42.39 |
| 2,733,539 | 2/1956 | Kelly | 43/44.82 |
| 2,782,551 | 2/1957 | Raymond | 43/44.82 |
| 2,800,740 | 7/1957 | Glaze | 43/44.82 |
| 3,331,151 | 7/1967 | Turrentine | 43/43.2 |
| 3,605,317 | 9/1971 | Pobst | 43/42.25 |
| 4,126,957 | 11/1978 | Randall | 43/43.16 |
| 4,905,402 | 3/1990 | Clark | 43/43.16 |
| 5,199,209 | 4/1993 | Cook | 43/43.16 |
| 5,373,658 | 12/1994 | Huppert | 43/43.16 |
| 5,440,832 | 8/1995 | Hnizdor | 43/43.16 |

Primary Examiner—Michael J. Carone
Assistant Examiner—Darren Ark
Attorney, Agent, or Firm—Steve Gremban

[57] ABSTRACT

A staggered treble fish hook is disclosed comprising a primary low profile hook having an acute angled barb and preferably a downward offset in its shank. The acute angle and offset in the primary hook lowers the profile (or bite) of the treble fish hook making it more accessible to attacking fish. The primary hook in combination with two staggered leading hooks, secondary and tertiary, forms a composite staggered treble hook.

6 Claims, 2 Drawing Sheets

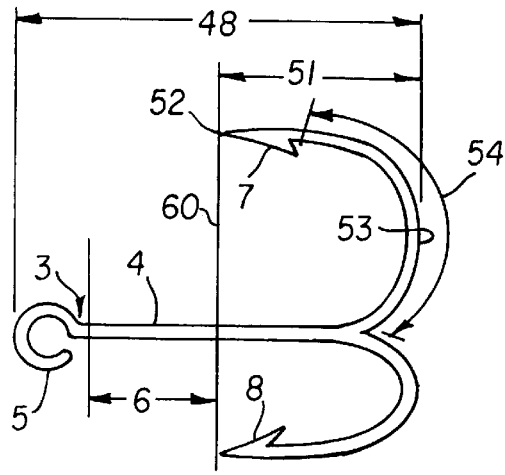
FIG. 1
Prior Art
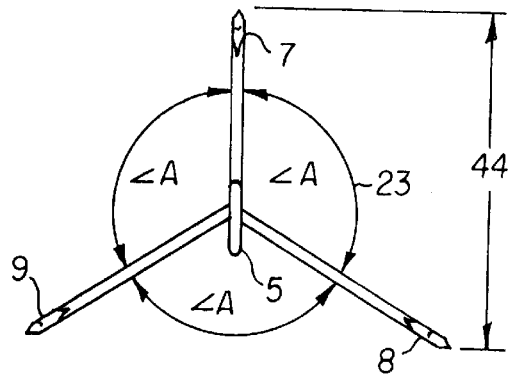
FIG. 2
Prior Art
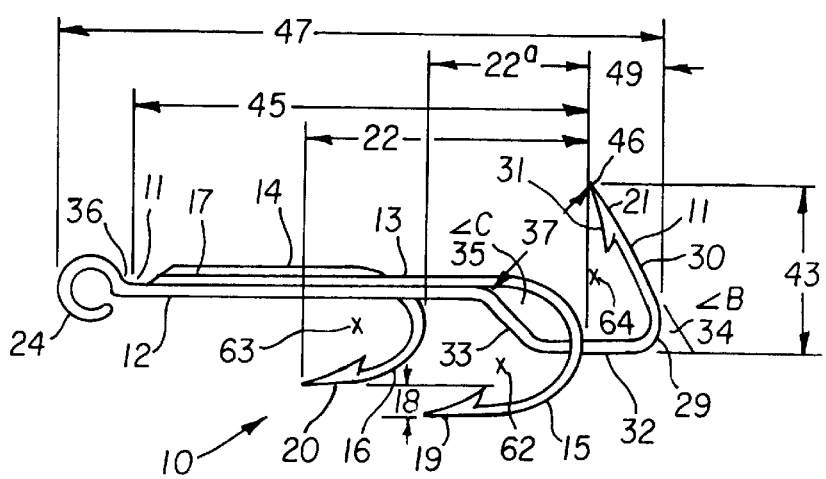
FIG. 3
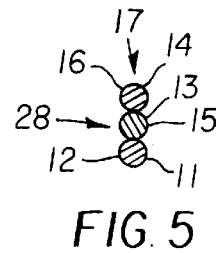
FIG. 5
FIG. 4
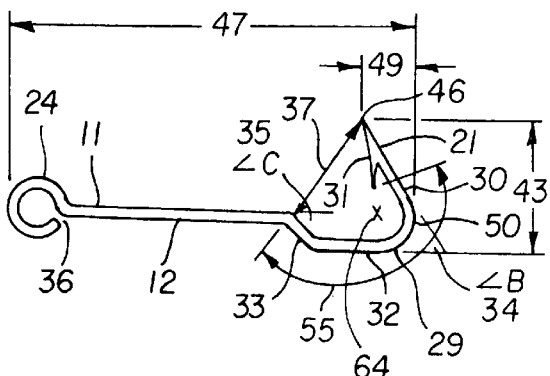
FIG. 6

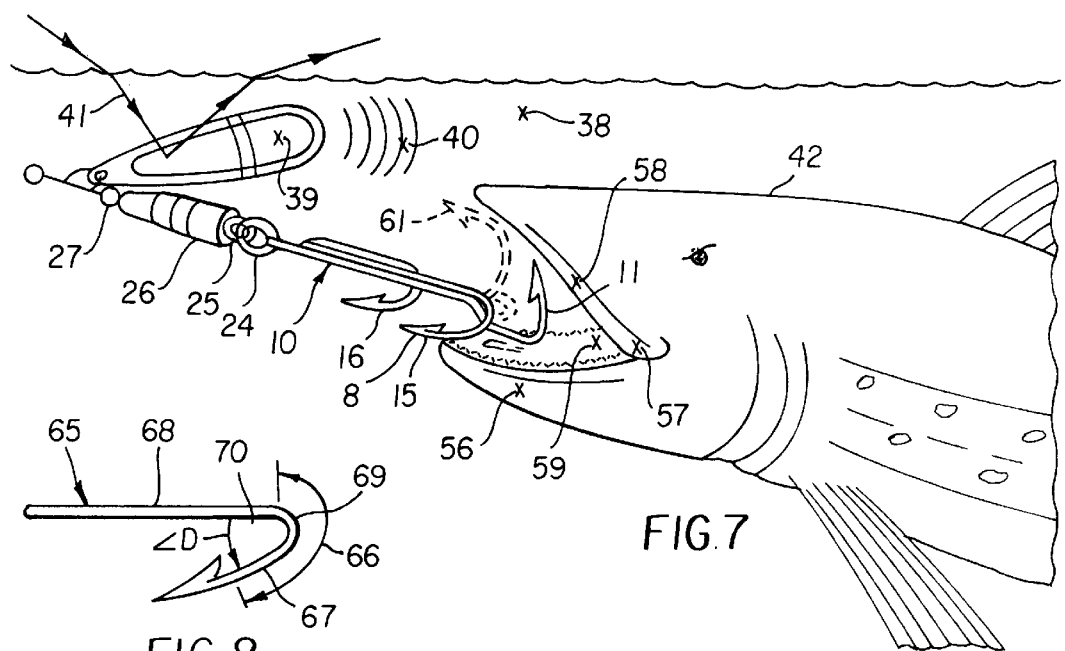
FIG. 7
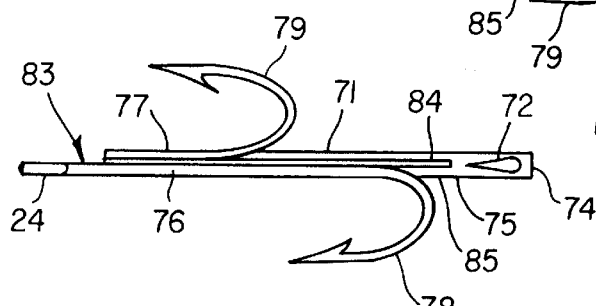
FIG. 8
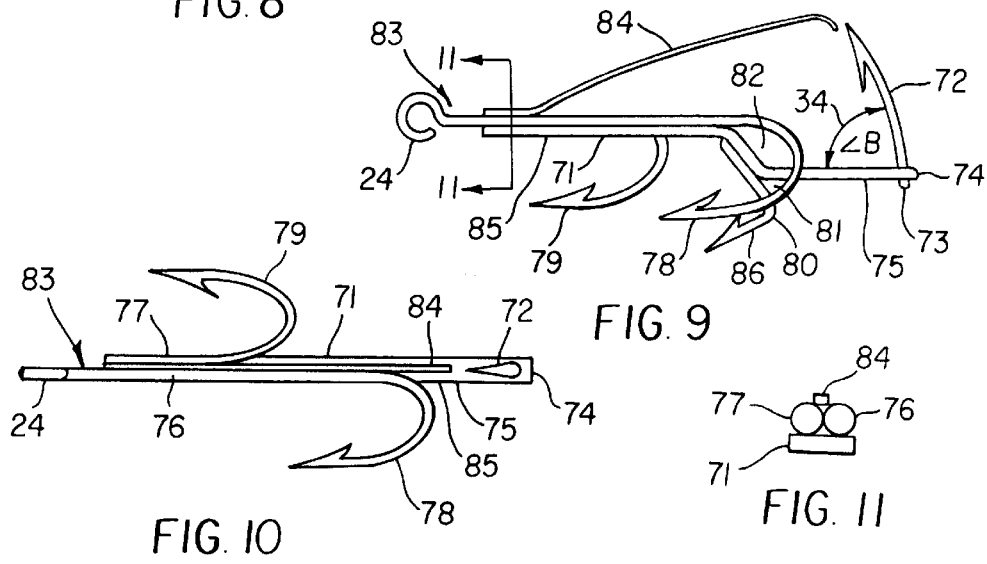
FIG. 9
FIG. 10
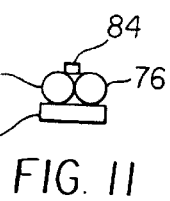
FIG. 11
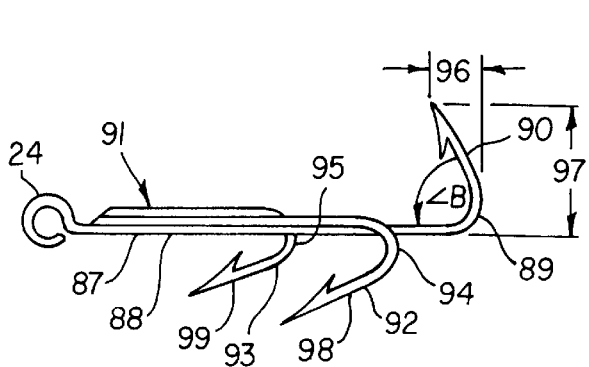
FIG. 12
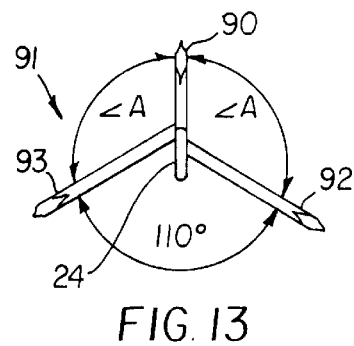
FIG. 13

LOW PROFILE STAGGERED TREBLE FISH HOOK

BACKGROUND OF THE INVENTION

1. FIELD OF THE INVENTION

The present Invention relates generally to an improved staggered treble fish hook which is attached to the loop at the rear end of a fishing lure (such as a spinner, spoon, plug, etc.) and casted out into waters inhabited by game fish. The fluttering motions of the lure as it is retrieved incites some fish to attack its rear end taking the lure to be food (a wounded minnow, insect, etc.). More specifically, the lowered profile (bite-height of the acutely upwardly pointing trailing primary hook) coupled with a three dimensional staggering of the substantially forward pointing barbs of secondary and tertiary hooks, make the device more effective in hooking attacking or nibbling fish of any size.

2. PRIOR ART

Attempts have been made in the past to produce fish hook devices (for use on lures) with increased effectiveness (over the widely used symmetrical treble hook device shown in FIGS. 1 and 2 of the drawings) in hooking, barbing and landing game fish.

Relevant prior art devices used on fishing lures are described in U.S. Pat. No. 3,331,151 issued on Jul. 18, 1967 to P. W. Turrentine, and U.S. Pat. No. 2,680,321 issued on Jun. 8, 1954 to O. D. Premo, and U.S. Pat. No. 2,782,551 issued on Feb. 26, 1957 to J. W. Raynond, and U.S. Pat. No. 3,605,317 issued on Sep. 4, 1968 to J. R. Pobst, and U.S. Pat. No. 2,703,947 issued on Mar. 15, 1955 to E. J. Petrasek ET AL, and U.S. Pat. No. 2,733,539 issued on Feb. 7, 1956 to J. M. Kelly, and U.S. Pat. No. 2,632,278 issued on Mar. 24, 1953 to J. W. Raymond. The Mustad company catalogs from as far back as 1983 and as recent as 1995, show a single worm hook that angles downward from the straight portion of its shank, then bends gently back and projects the point upward at an angle of about 23 degrees with the shank.

None of the aforesaid prior art and no other means, known to the applicant, attempts to utilize a single rearwardly extending low profile trailing primary hook member with an acutely upturned barbed hook that is symmetrically balanced by the presence, position and orientation of two axially adjoining leading hooks with their barbs staggered so as to elongate the strike zone. The strike zone is the region in front of the distributed hook barbs of the treble which if struck by a fish's mouth, causes the fish to be pricked, hooked and barbed.

SUMMARY OF THE INVENTION

Briefly described, the present invention relates generally to fish hooks and more particularly to an improved staggered treble fish hook in accordance with preferred embodiments of the invention having the combined characteristics of a primary hook member having an acutely upturned barbed hook. The primary hook member has a shank that is offset downwardly (this lowers the overall height/profile of this treble hook device) and rearwardly of its secured length of contact with the straight portion of the shank of a secondary hook member. A tertiary hook member is secured to the primary and/or secondary member. More specifically, the downward offset in the primary hook's shank comprises a short substantially straight base that ends in an upturned elbow that continues as a short stalk that is terminated with a barb. The stalk is positioned at an acute angle to the shank and/or base of the primary hook. The stagger of the substantially forward pointing barbs of the three hooks greatly extends the zone around said treble in which a nibbling or biting fish would be pricked, hooked and barbed.

BRIEF DESCRIPTION OF THE DRAWINGS

The invention will be better understood upon consideration of the following detailed description taken together with the accompaning drawings in which like elements in various figures have like designations and in which:

FIGS. 1 and 2 show side and front elevational views of an ordinary prior art treble fish hook device with the bend planes of its three hooks angularly distributed in a symmetrical pattern 120° apart and their three barbs directed toward the eye of the fish hook and non-staggered, that is lying in the same plane.

FIG. 3 shows the side elevational view of a composite low profile staggered treble fish hook device in which one preferred embodiment of this invention is embodied.

FIG. 4 is a front elevational view of the treble fish hook of FIG. 3.

FIG. 5 is a section view taken substantially along line 5—5 of FIG. 3.

FIG. 6 is a side elevational view of the primary hook invention of the treble fish hook of FIG. 3.

FIG. 7 is a perspective view of the treble fish hook of this invention shown in FIGS. 3 and 4 (attached to a fishing lure) in fish-inhabited water about to be bitten by a fish, and also showing by dotted lines the relative position of a prior art treble hook.

FIG. 8 is a segmental view of a wide-angle secondary or tertiary fish hook.

FIG. 9 is a segmental side elevational view of another embodiment of a staggered treble fish hook of this invention.

FIG. 10 is a top plan view of the fish hook of FIG. 9.

FIG. 11 is a section view taken substantially along line 11—11 of FIG. 9.

FIG. 12 is a side elevational view of still another embodiment of the staggered treble fish hook of this invention.

FIG. 13 is an end elevational view of the treble fish hook of FIG. 12.

DESCRIPTION OF THE PREFERRED EMBODIMENTS

Because of the low profile design and rearwardly extension of the primary hook of the staggered treble fish hook, an attacking fish does not have to open its mouth wide enough to encircle all three radially positioned hooks, but can bite just the trailing primary hook member to become hooked and barbed. The act of biting this uniquely shaped upturned primary hook helps imbed/set the hook barb in the fish's mouth.

FIGS. 1 and 2 of the drawings show a prior art straight shank ordinary treble fish hook 3 comprising a straight shank 4 having an open-ring eyelet 5 at one end and three angularly spaced forward pointing hook at the opposite end. The strike zone 6 for treble 3 is defined as the three dimensional region from eyelet 5 back to the three forward pointing hook barbs 7, 8 and 9 that terminate in a thin plane.

FIGS. 3, 4 and 5 of the drawings disclose one preferred embodiment of a low profile staggered treble fish hook 10 in which a primary fish hook 11 is embodied. Features of said low profile treble 10 device are described and compared with those of said ordinary treble 3 to highlight the unique advantages said treble 10 offers because of its low profile design and staggered hook barb arrangement. FIG. 5 shows a cross sectional view of shanks 12, 13 and 14 of hooks 11, 15 and 16 which are stacked lengthwise atop one another to form vertical ribbed bar-or-shanks 17, see FIGS. 3 and 5. The formation of ribbed bar-of-shanks 17 also produces a slight vertical stagger 18, (see FIGS. 3 and 4) between hook points 19 (of secondary hook 15) and 20 (of tertiary hook 16) in the Y-direction (see FIGS. 3 and 4) relative to hook point 21 of primary hook 11, in addition to and different from the much greater horizontal X-direction stagger 22 among primary hook point 21, secondary hook point 19 and tertiary hook point 20. FIG. 4 shows the front end view of low profile staggered treble fish hook device 10. The bend planes of the three hooks (11, 15 and 16), shown in FIG. 3, are uniformly distributed and separated by angle ∠A, 23 (∠A=120°), see FIG. 4.

FIG. 6 is a side elevational view of the primary hook 11 of the staggered treble fish hook 10 of FIGS. 3 and 4. Said treble hook 10 is particularly useful when connected by its open-ring ball eye 24 to the closed loop 25 at the rear end 26 (see FIG. 7) of an existing fishing lure 27. Treble fish hook 10 can also be connected to new lures at manufacture or retrofitted to any lures. In a preferred embodiment of the invention, contoured shank primary hook member 11 of treble 10 will have the ball eye 24. Either of the three hooks (primary 11, secondary 15 or tertiary 16) of treble 10 can have eye 24. The cross section 28 of primary hook shank 12 (see FIG. 5) is round rod regular shaped in this embodiment. The front-most parts of primary hook 11 are its upturned elbow 29, barbed-stalk 30 with rearwardly pointing barb 31, base 32, and short declination arm 33. Declination arm 33 slopes downwardly from shank 12 (straight portion of primary hook 11), then levels out into base 32 which is made essentially parallel with shank 12 of primary hook 11, see FIG. 3. Alternatively, the arm 33 and base 32 may be positioned along a straight line. Elbow 29 is formed as base 32 turns upward at acute angle ∠B, 34 (∠B=55°±5°) from shank 12 and/or base 32 (see FIG. 3). Stalk 30 is terminated by primary hook point 21 and its oppositely pointing barb 31. The downward and forward slope of declination arm 33 from shank/straight portion 12 of primary hook 11 is at declination angle ∠C, 35 (∠C=45°). Primary hook shank 12 is terminated at its rearward end 36 by open-loop eyelet 24 which is for connecting said treble 10 to a fishing lure 27, see FIG. 7. The three hooks (11, 15 and 16) of said treble 10 (FIGS. 3 and 4) can all be of different sizes, or any combination of sizes. The choice of hook sizes should be determined in accordance with the intended end use (types and sizes of fish sought). The gap 37 of primary hook 11 is greater than that of ordinary hooks of equal size. Angle ∠B, 34 is the angle of turn-up of stalk 30 (of primary hook 11) from its base 32.

For use in fishing, said treble fish hook device 10 is attached to rear end 26 of a fishing lure 27 (such as the spinner shown in FIG. 7) which is casted out into fish-inhabited waters 38. Lure 27 has a spinner blade 39 that rotates as lure 27 is pulled/retrieved through water 38. As blade 39 rotates, it produces wave disturbances 40 in water 38 and reflect incident light 41. The commotion, produced by the fluttering and movement of lure 27 in water 38, attracts the attention of nearby game fish 42 and incites it to chase and attack the lure's rear end 26 considering lure 27 to be food (such as a struggling wounded minnow or other aquatic life). Since rear end 26 is the part of fishing lure 27 where said treble device 10 is attached, fish/trout 42 will bite/strike at trailing member/primary hook 11 of treble hook device 10. And since primary hook 11 extends rearwardly of and trails the other two hooks (secondary 15 and tertiary 16), an attacking fish 42 will generally first encounter the front-most part (barbed-stalk 30) of primary hook 11 (see FIGS. 6 and 7).

Bite height 43 of said primary hook 11 is also the bite height for treble 10, which is approximately 73% of bite height 44 of said ordinary treble 3, see FIGS. 1 and 3. Horizontal/elongated strike zone 45 along said treble 10 is more than two times longer than horizontal strike zone 6 along ordinary treble 3, see FIG. 3.

For attacking game fish 42 to become hooked by said treble 10, it may bite only single trailing primary hook member 11 (or take two, or all three of its hooks (see FIGS. 3 and 7) to become hooked and barbed. Bite height 43 of said primary hook 11 is the vertical distance from its base 32 up to its point tip 46, which measures 0.45" (using hook size #2), see FIGS. 3 and 4. For ordinary treble 3, in also using hook size #2 (see FIG. 1), the equivalent bite height 44 measures 0.62". In using the same hook sizes, bite height 43 of treble 10, its single rearwardly protruding primary hook 11 is 38% less than bite height 44 of ordinary treble 3. The overall length 47 of said treble 10, using hook size #2 is approximately 1.5", while ordinary treble 3 has a length 48 of 0.9", using the same size (#2) hook. Hook butt 49 of primary hook 11 (Hook Butt is a designer term, herein defined as the distance from just behind the front of its point tip 46 out to a line perpendicular to its shank 12 and tangent to vertex 50 of its bend/elbow 29, see FIG. 3). The magnitude of primary hook butt 49 (measures 0.12" using hook size #2) is determined by elbow angle ∠B, 34, (in which ∠B=55°±5° is the angle between base 32 and barbed-stalk 30). Butt 51, of ordinary treble 3 (see FIG. 1) is the distance from point-tip 52 of its barb 7 (or 8 or 9) out to a line perpendicular to its shank 4 and tangent to vertex 53 of bend 54 of ordinary treble 3.

Point 21 of contoured shank primary hook 11 is set at angle ∠B, 34, relative its shank 12, see FIG. 3. Points 19 and 20 of secondary and tertiary hooks (15 and 16) are substantially parallel with ribbed bar-of-shanks 17. Bend 55, of primary hook 11, includes declination arm 33 (at declination angle ∠C, 35), base 32, elbow 29 (at angle ∠B, 34), and stalk 30, see FIG. 6. {Note, the size of a hook determines the magnitude of its bend and bite.}

Butt 51 of ordinary treble hook 3, using hook size #2, (see FIG. 1) measures 0.42". In using the same hook size on both trebles, 10 and 3, the non-useful part (butt 51) of ordinary treble hook 3 is 3.5 times greater than butt 49 of primary hook 11 of said treble 10. If a fish's mouth (mandible 56, maxilla 57 or premaxilla 58, see FIG. 7) strikes just the butt 49 and/or bend 55 of primary hook 11 (or of any hook), 15, 16, etc., that fish will not be pricked or hooked. This reduced (smaller) butt 49 and upturned barbed-stalk 30 of primary hook 11 increases the probability that an attacking fish's open mouth 59 will close over primary hook 11 and fish 42 will become hooked.

The barbs of the three hooks 7, 8 and 9 of ordinary treble 3 are generally set parallel with its shank 4 and their three barbs end in one thin plane 60, not staggered, see FIG. 1.

FIG. 7 shows the two treble hooks, said ordinary treble 3 and low profile treble hook 10, with their respective shanks aligned axially so their relative dimensions, shapes and forms can be visually compared. In FIG. 7, treble hook device 10 is connected to fishing lure 27 which is being chased by game fish 42 with its open mouth 59 ready to bite its trailing member, said treble 10 for food. An outline 61 of ordinary treble 3 is dashed-in to overlay said treble 10 for comparison. If fish 42 closes its mouth 59 as illustrated in FIG. 7, it would be hooked by primary hook 11 of treble hook device 10. Fish 42 would not be pricked, or hooked by ordinary treble hook 3, as its mouth (56 and 58) would only rub/scrape against butts 51 of ordinary treble's hooks 7, 8 and 9.

The general purpose of rearwardly pointing barb 31 (see FIG. 3), as part of primary hook point 21, is to snag in a fish's mouth (56, 58 and/or 57) to prevent fish 42 from disgorging hooks 11, 15, etc.

A new term, Bite Accessibility Factor (BAF) is introduced to compare the accessibility of said treble 10 to an attacking fish 42 relative to the accessibility of ordinary treble 3. BAF is defined herein as the reciprocal of the sum of the butt and bite height of a treble, or any other hook including single hooks. This statement in mathematical equation form (applied to said treble 10) is:

$$BAF = \frac{1}{Butt\ (49) + Bite\ (43)}$$

For ordinary treble 3, butt length 51 equals 0.42 inches and bite height 44 equals 0.62" (in using hook size #2) see FIG. 1. Their sum is 1.04". The reciprocal of this number is 0.9615/inch. For said treble 10, butt 49 equals 0.12" and bite 43 equals 0.40" (in using hook size #2). Their sum is 0.52". The reciprocal of this number is 1.923/in. This means that the Bite Accessibility Factor of said treble 10 is just over two times (2.10) greater than the BAF of ordinary treble 3. Therefore, it is twice as easy for attacking fish 42 to take the two dimensional trailing primary hook 11 as it is to take three dimensional ordinary treble hook 3, or any single ordinary hook 15, 16, etc. of equal size. Because of the reduced butt 49 and the low profile design of primary hook 11, an attacking fish 42, does not have to open its mouth 59 as wide or bite as deeply into primary hook 11 to become hooked and barbed as it would in striking ordinary treble 3, see FIG. 7. The act of biting upturned primary hook 11 (of said treble 10) by a fish 42, helps set-the-hook (in the fish's mouth 59 even before the fisherman knows he/she is getting a strike). In contrast, in using ordinary treble hook 3, the fisherman often has to feel the strike, then jerk the line to set-the-hook. Declination angle ∠C, 35, arm 33 and acute angle ∠B, 34 are instrumental in lowering profile (bite height 43) of primary hook 11 relative to bite 44 of ordinary treble 3, see FIGS. 1 and 3.

Features of said treble 10 are: its low profile design resulting from the downward offset in the shape of primary hook 11 and the acute angle of the upturned barbed stalk 30; that the three barbs (21, 19 and 20) of its three hooks (11, 15 and 16) are staggered in three dimensions; that the rearward protrusion of single upturned barbed-stalk 30 of primary hook 11 increases the strike zone 45 of treble 10 and makes it possible to bait primary hook 10 with live bait; the combination of the aforesaid features greatly increase the capability of said treble 10 to hook any fish 42 that attacks lure 27 taking it to be food.

Bend planes 62 and 63 of secondary and tertiary hooks 15 and 16, fan out from ribbed bar-of-shanks 17 at angle A, 23 (∠A=±120°, relative to bend plane 64 of primary hook 11, see FIG. 4), this angular distribution of said hooks gives treble 10 a hydrodynamic symmetry equal to that of any ordinary treble 3, see FIGS. 2 and 4.

FIG. 8 is a segmental view of a wide-angle fish hook 65. Wide-angle hook 65 can be used for the secondary and/or tertiary members of treble hook device 10. Bend 66, of wide-angle hook 65, does not curve around 180° to direct the hook's barb-stalk 67 straight forward, but rather barbed-stalk 67 is only slightly curved, as shown in FIG. 8 in angling out from shank 68 to form elbow 69 at angle ∠D, 70 (∠D=25°±10°). Said wide-angle hook in use, facilitates hooking fish that attack a lure 27 from a rear side.

FIG. 9 shows additional versatility of said treble 10 wherein: round rod hook shank 12 (of primary hook 11) is replaced by a contoured flat narrow stiff rectangular metal strip 71 which has a similar profile shape to that of primary hook 11 and an upturned barbed-stalk 72 that projects rearward and upward at angle B, 34, (in which ∠B=55°±5°, as does barbed-stalk 30 from base 32 of primary hook 11) wherein its free end 73 is affixed by any suitable means near front end 74 of base 75 of strip 71; round rod shanks 76 and 77 (of secondary and tertiary hooks 78 and 79 are fixed side-by-side lengthwise (see FIGS. 9 and 10) atop metal strip 71); an L-shaped barbed hook jag 80 (affixed to rear side 81 of declination arm 82 that points rearwardly and downward) to increase the capability of contoured strip treble 83 for hooking small and large fish more securely; and a thin flexible metal strip as weed guard 84 (affixed atop shanks 76 and 77) to protect upturned barbed-stalk 72 (of contoured primary hook 85 from becoming snared in water grass/debris). Similar weed guards 84 can also be used to protect secondary and tertiary hooks (78 and 79) from becoming entangled in grass/debris. Short barbed-stalk 86 (of L-shaped jag 80, see FIG. 9) points at an angle such that when a fish 42 closes its mouth 59 over upturned barb-stalk 72 of primary hook 85 its premaxilla 58 would be hooked by barbed-stalk 72 and its mandible 56 would be hooked by L-shaped jag 80 (see FIGS. 7 and 9). Said contoured flat strip shank 71, of contoured primary hook 85, causes lure 27 to execute a more dynamic retrieval trajectory (that attracts game fish) as lure 27 is being reeled in. Either of the hooks, secondary 78 or tertiary 79, can have an open ring ball eye 24 for connecting said contoured strip treble 83 to a lure 27.

FIG. 10 is a top plan view of said contoured flat strip low profile staggered treble fish hook device 83 of FIG. 9. All three hooks, contoured strip primary 85, secondary 78 and tertiary 79 can be of different hook sizes, or of the same size, or any combination thereof. In the FIGS. 9 and 10 drawing, open ring ball eye 24 is part of secondary hook 78.

FIG. 11 is a cross sectional view 11—11 of shanks 71, 76 and 77 of hooks 85, 78 and 79 of said flat strip treble device 83 shown in FIG. 9 plus the cross sectional view of weed guard 84. Other cross sectional configurations may also be used.

FIG. 12 is a side elevational view of still another embodiment of the invention wherein straight-shank primary hook 87 replaces contoured shank primary hook 11 of low profile staggered treble fish hook device 10 (shown in FIG. 3.) and ordinary 180° curve-around secondary and tertiary hook members (15 and 16) of said treble 10 are replaced by wide-angle hooks 65 (of different shank lengths 68), see FIG. 8. Shank 88 of straight-shank primary hook 87 is essentially straight from its ball eye 24 out to its elbow 89 from which barbed stalk 90 turns up at acute angle ∠B, 34 (in which ∠B=55°±5°), from shank 88, see FIG. 12. Straight-shank treble 91 can be made with wide-angle secondary 92 and tertiary 93 hook type 65 (or with ordinary 180° curve-around hooks such as 78, 79 as shown in FIGS. 9 and 10). Wide-angle secondary 92 and tertiary 93 hooks (shown in FIG. 12) have different shank lengths. Straight-shank treble 91 (a variation of low profile staggered treble 10) has some features of treble 10, its: three hooks, 87, 92 and 93 are staggered; and primary hook 87 extends forwardly (of bends 94 and 95 of wide-angle secondary and tertiary hooks 92 and 93) to present upturned barbed-stalk 90 of straight-shank primary hook 87 to an attacking fish 42. The extension of straight-shank 88 beyond bend 94 (of secondary wide-angle hook 92) turns up (at angle ∠B 34, ∠B=55°±5°) forming elbow 89 (in straight-shank primary hook 87, see FIG. 12) that leads into upturned barbed-stalk 90. Together, these features increase the Bite Accessibility Factor (defined as the reciprocal of the sum of the butt and bite of a hook) over that of ordinary treble hook 3, of FIG. 1. The butt 96 and bite 97 of straight-shank primary hook 87 are equal to those of said primary hook 11 of low profile treble 10 of FIG. 3. Different hook sizes can be used in constructing straight-shank treble hook 91.

FIG. 13 shows an end elevational view of the treble fish hook 91 of FIG. 12. The planes of the secondary and tertiary hooks (92 and 93) are set at angles approximately ±125°±10° relative to the plane of straight-shank primary hook 87. Barbed stalks 98 and 99 of wide-angle hooks 92 and 93 of straight-shank treble 91, are similar to wide-angle hook 65 of FIG. 8.

Having thus described the invention, it will be evident that other modifications and alterations may be proposed by those skilled in the art. For example: the angles ∠A, 23 and ∠B, 34 employed in shaping primary hook 11 may be altered to produce a slightly different shape; the angle ∠C, 35 at which bend planes 62 and 63 (of secondary and tertiary hooks 15 and 16) fan out from bend plane 64 (of primary hook 11) can be altered; the geometrical configurations in which hook shanks 12, 13 and 14 are bonded together can be altered; the length of strike zone 45 of treble 10 can be altered; the hooks' lengths and sizes can be different; the hooks can be made of different metals; and other variations in the structure and shape of low profile staggered treble 10 could be proposed. Such modifications would, however come within the scope of the annexed claims.

What is claimed is:

1. A fish hook comprising:
   an elongated straight wire shank having a shank free end and an opposite shank end;
   an eyelet secured to said shank free end;
   a substantially straight wire stalk having a stalk free end and an opposite stalk end;
   a pointed barb at said stalk free end; and
   a curved wire section integrally connecting said opposite stalk end to said opposite shank end such that said stalk defines an acute angle relative to said shank of substantially 55°±5°.

2. The fish hook according to claim 1 wherein said curved wire section of said fish hook is offset from said shank whereby the distance said barb is radially spaced from said shank is minimized.

3. A treble fish hook comprising:
   a primary hook member comprising an elongated straight wire shank having a shank free end and an opposite shank end;
   an eyelet secured to said shank free end;
   said primary hook member further comprising a substantially straight wire stalk having a stalk free end and an opposite stalk end;
   a pointed barb at said stalk free end;
   said primary hook member further comprising a curved wire section integrally connecting said opposite stalk end to said opposite shank end such that said stalk defines an acute angle relative to said shank of substantially 55°±5°; and
   secondary and tertiary hook members secured to said shank of said primary hook member such that said primary, secondary and tertiary hook members are in horizontally spaced relation along said shank and in angularly spaced relation around said shank.

4. The treble fish hook according to claim 3 wherein said curved wire section of said primary hook member is offset from said shank whereby the distance said barb is radially spaced from said shank is minimized.

5. The treble fish hook according to claim 4 wherein said curved wire section has an offset arm.

6. The treble fish hook according to claim 5 wherein a hook jag is secured to and extends outwardly from said offset arm.

* * * * *